(12) United States Patent
White et al.

(10) Patent No.: US 6,957,717 B1
(45) Date of Patent: Oct. 25, 2005

(54) POWDER DRIVEN SUPPORT DEVICE

(75) Inventors: Michael L. White, Boaz, AL (US); Frederick James Diggle, III, Birmingham, AL (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 0 days.

(21) Appl. No.: 10/646,068

(22) Filed: Aug. 22, 2003

(51) Int. Cl.$^7$ ................................................ E04G 3/00
(52) U.S. Cl. ...................... 182/92; 182/90; 182/127; 248/216.1
(58) Field of Search ............................. 182/92, 90, 91, 182/127, 150, 189; 248/216.1

(56) References Cited

U.S. PATENT DOCUMENTS

| | | | |
|---|---|---|---|
| 83,913 A | 11/1868 | Bradley | |
| RE9,440 E | 11/1880 | Judd | |
| 279,113 A | 6/1883 | Clow | |
| 306,874 A | 10/1884 | Thatcher | |
| 415,181 A | 11/1889 | Wilcox | |
| 543,121 A * | 7/1895 | Bates ....................... | 248/217.4 |
| 601,849 A * | 4/1898 | Aiken ......................... | 182/92 |
| 682,753 A | 9/1901 | Teele | |
| 975,235 A | 11/1910 | Hansen | |
| 1,313,795 A | 8/1919 | Davis | |
| 1,798,468 A | 3/1931 | Hartzsler et al. | |
| 2,188,084 A | 1/1940 | Kuckuck | |
| 2,257,640 A | 9/1941 | Muller | |
| 2,307,348 A | 1/1943 | Chester | |
| 2,697,857 A | 12/1954 | Eckel | |
| 3,088,361 A | 5/1963 | Hallock | |
| 3,341,651 A | 9/1967 | Odegaard | |
| 3,483,790 A | 12/1969 | Matthews | |
| 3,848,080 A | 11/1974 | Schmidt | |
| 3,934,802 A | 1/1976 | Jennings | |
| 4,018,023 A | 4/1977 | Anderson | |
| 4,068,790 A * | 1/1978 | Osterle et al. .................. | 227/8 |
| 4,157,001 A | 6/1979 | Pickles | |
| 4,289,058 A | 9/1981 | Paskert | |
| 4,449,612 A * | 5/1984 | Southard ....................... | 182/92 |
| 4,655,380 A * | 4/1987 | Haytayan ....................... | 227/9 |
| 5,135,150 A * | 8/1992 | Chun ............................. | 227/9 |
| 5,279,388 A * | 1/1994 | Laughlin et al. ............... | 182/92 |
| 5,513,935 A | 5/1996 | Sharber et al. | |
| 5,549,234 A | 8/1996 | Hong | |
| 5,606,832 A | 3/1997 | Keith et al. | |
| 5,624,007 A * | 4/1997 | Mahaffy ....................... | 182/92 |
| 5,881,837 A * | 3/1999 | Leicht .......................... | 182/92 |
| 5,887,677 A * | 3/1999 | Malmgren .................... | 182/92 |

(Continued)

OTHER PUBLICATIONS

U.S. Appl. No. 10/646,204 filed Aug. 22, 2003.

(Continued)

*Primary Examiner*—Bruce A. Lev
(74) *Attorney, Agent, or Firm*—Withers & Keys, LLC

(57) ABSTRACT

A support device may be used by a technician when performing elevated line work, for example. The support device may include a shaft having a first end and a second end and threads disposed at the first end of the shaft for use in securing the device to a pole. The support device further may include at least one rigid support member disposed on the second end of the shaft for supporting an object from the device and a pusher attached to the second end of the shaft and adapted to drive the support device into the pole. The pusher may include a driving end adapted to receive force applied from a piston of a powder driven tool, an extension portion extending from the driving end and contacting the support device.

14 Claims, 6 Drawing Sheets

U.S. PATENT DOCUMENTS

| | | | | |
|---|---|---|---|---|
| 5,899,124 A | * | 5/1999 | Cross, Jr. | 81/176.15 |
| 5,967,475 A | * | 10/1999 | Johnson | 248/217.4 |
| 6,585,142 B1 | * | 7/2003 | Chen | 227/130 |
| 6,726,162 B1 | * | 4/2004 | Winter | 248/218.4 |
| 6,729,437 B1 | * | 5/2004 | Apple | 182/92 |
| 2002/0098062 A1 | | 7/2002 | Beale et al. | |
| 2003/0140739 A1 | * | 7/2003 | McKivigan | 81/124.2 |
| 2004/0064932 A1 | * | 4/2004 | Sprague | 29/525.01 |
| 2004/0099300 A1 | * | 5/2004 | Warren | 135/118 |
| 2004/0129496 A1 | * | 7/2004 | Clark | 182/92 |

OTHER PUBLICATIONS

U.S. Appl. No. 10/646,006 filed Aug. 22, 2003.
U.S. Appl. No. 10/687,151 filed Oct. 16, 2003.
U.S. Appl. No. 10/643,177 filed Aug. 18, 2003.

* cited by examiner

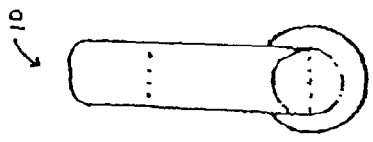
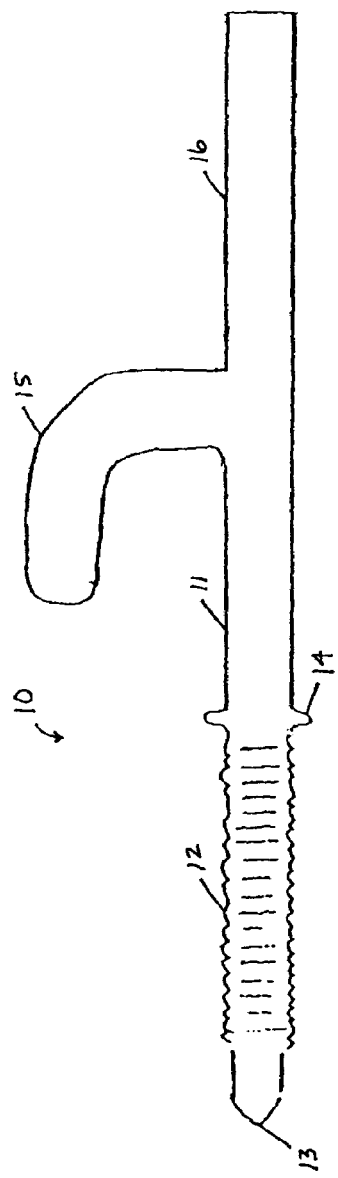
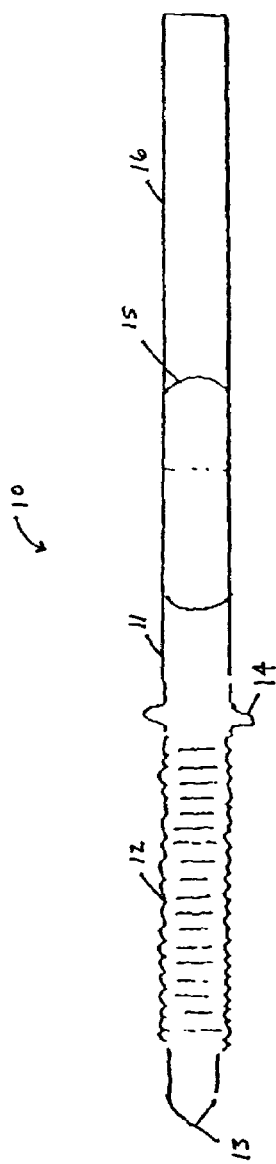
FIG. 1B
FIG. 1A
FIG. 1C

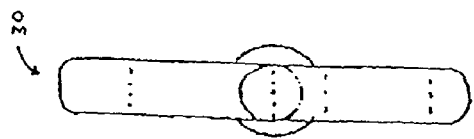
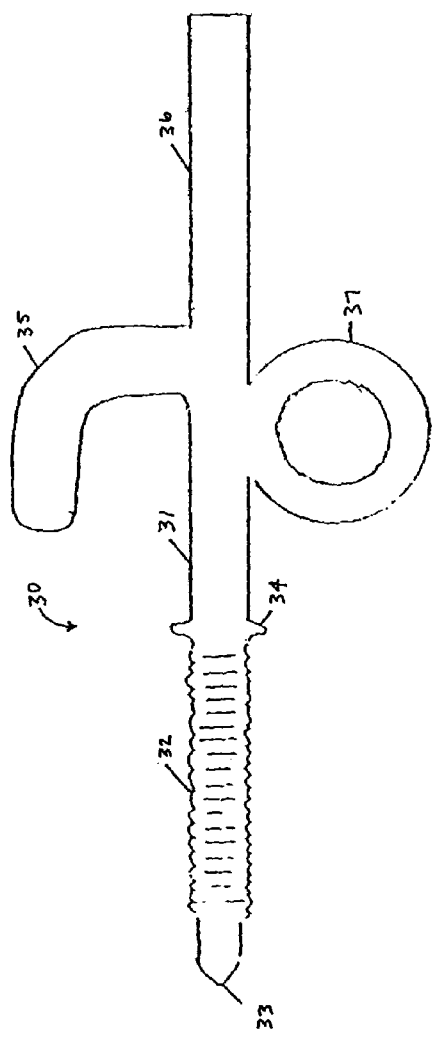
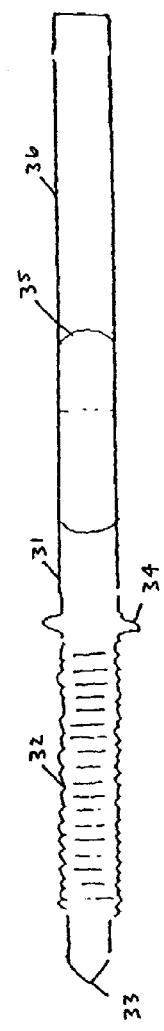
FIG. 3B
FIG. 3A
FIG. 3C

POWDER DRIVEN SUPPORT DEVICE

FIELD

The invention, in various embodiments, relates generally to devices and methods for their manufacture and use in working on, for example, utility poles.

BACKGROUND

In the telecommunications or electronics industry, it is common practice for a technician (also referred to as a "linesman") to scale a utility pole. The technician scales the utility pole to install equipment, to repair broken or damaged communications equipment, to test equipment, and/or for other work-related reasons. To safely and effectively scale a pole and perform line work, the technician must maintain and properly utilize various types of scaling and safety equipment. To utilize the various types of scaling and safety equipment, the technician must also have the skills and the physical ability to sustain a great strain on their legs and back while the technician climbs and/or maintains a position about the pole.

Conventional climbing equipment employed by a technician typically includes a pair of gaffs, a body belt, and/or a safety strap. In general, the gaff is a sharp blade protruding from the inside of the foot about mid-foot level and having straps that secure about the leg and/or feet of a technician. To climb, the technician drives one of the gaffs into the pole, steps up onto the gaff, and then drives the other gaff into the pole at a higher position. The technician continues taking steps up or "gaffs up" the pole until reaching a desired height.

The body belt is secured around the waist of the technician. The body belt includes pockets for carrying tools and rings (e.g., "D-rings") for attaching the safety strap. The safety strap typically includes a hook (e.g., snap buckle) at each end and a buckle for adjusting its length. During climbing, both hooks of the safety strap are attached to the same ring of the body belt on the left hip. Once in a position to perform line work, the technician releases one end of the safety strap from the body belt. The technician then wraps the safety strap around the pole and reattaches the end of the safety strap to the body belt, thus allowing the technician to use his hands at the desired working elevation. Thus, the technician uses the safety strap for climbing as well as supporting the technician in his working position about the pole.

During elevated line work, both gaffs are pressed into the pole and the technician leans back against the safety strap. This position allows the weight of the technician to be supported by the gaffs and the tension in the safety strap.

SUMMARY

In one general aspect, a support device may be used by a technician when performing elevated line work, for example. The support device may include a shaft having a first end and a second end and threads disposed at the first end of the shaft for use in securing the device to a pole. The support device further may include at least one rigid support member disposed on the second end of the shaft for supporting an object from the device and a pusher attached to the second end of the shaft and adapted to drive the support device into the pole. The pusher may include a driving end adapted to receive force applied from a piston of a powder driven tool, an extension portion extending from the driving end and contacting the support device.

Implementations may include one or more of the following features. For example, the support device may be constructed of stainless steel and/or titanium. The shaft may have concave surface and/or a stop member positioned distally of the threads on the shaft. The device may include one or more rigid support members including a curved portion and/or a ring portion. The pusher may have a concave or a planar surface. The pusher also may be tapered and/or hooked. In some embodiments, the pusher may be thinner than the shaft and/or include a notch.

In another general aspect, a pusher for driving a support device into an object may include receiving means adapted to receive force applied from a piston of a powder driven tool and extension means extending from the receiving means, the extension means being attached to a shaft of the support device. The support device may include rigid support means disposed on the shaft for supporting an object and retention means for securing the support device to a pole. In some implementations, the extension means may include a notch for detaching the pusher from the support device.

In another general aspect, a support assembly may include a powder driven tool and a support device. The powder driven tool may include a powder cartridge and a trigger for actuating a piston within a barrel. The support device may include a pusher adapted to received force applied from the piston for driving the support device into a pole and at least one or more of a curved portion and a ring portion. In some implementations, the assembly may include a muzzle extender connected to the barrel of the powder driven tool for cradling the support device and/or an extension pole for elevating the powder driven tool.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

FIGS. 1A–1C illustrate one embodiment of a support device.

FIGS. 3A–3C illustrate one embodiment of a support device.

DETAILED DESCRIPTION

Figure 2:
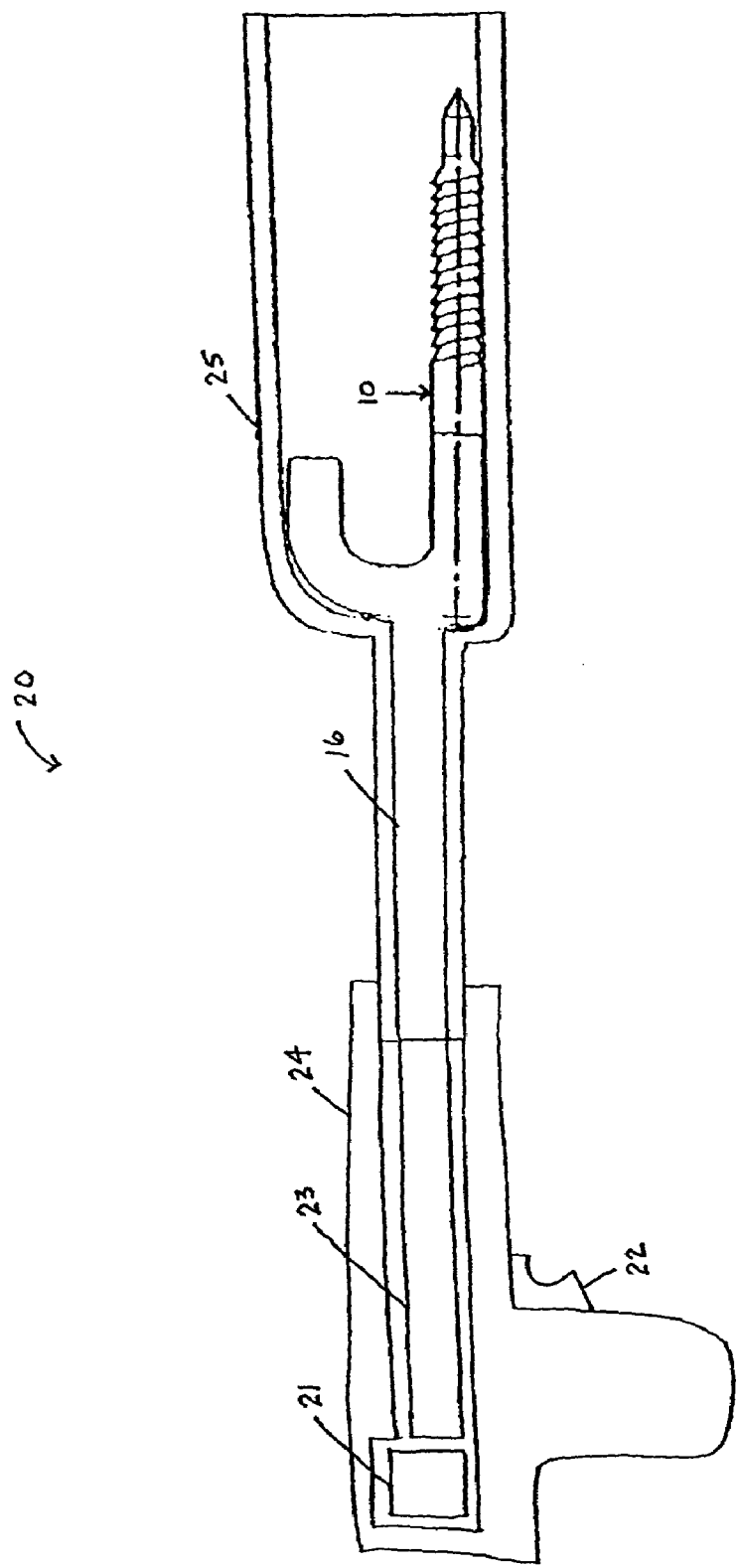
FIG. 2 illustrates one embodiment of a support device and powder driver assembly.

It can be appreciated that commercial entities and other organizations that employ workers in elevated environments are aware of the potential risks attendant upon work performed in such environments. In view of this awareness, commercial entities and other organizations devote time and resources to promoting the safety of workers performing work in elevated environments to make the performance of work as safe as possible. Promoting safety of workers in elevated environments may involve instituting training programs and/or providing workers with a variety of support devices, support systems, backup devices and systems, and/or other means that promote the stability and safety of workers in elevated environments. Despite the best efforts of an organization to enhance the safety of its workers and reduce the risk of falling from elevated structures, for example, it is nonetheless difficult to eliminate all risks to workers performing work on such elevated structures.

Redundant systems for promoting safety of workers on elevated utility structures may thus sometimes be used. Such redundant systems can sometimes be beneficial in addition to the myriad of existing support systems, methods, devices and/or other apparatus employed by workers on elevated structures to reduce or mitigate risks associated with falling from utility structures, for example.

Referring to FIGS. 1A–1C, one embodiment of a support device 10 is illustrated. It can be appreciated that the choice of materials for construction of the support device 10 may be driven, at least in part, by the motivation to create an apparatus that is relatively lightweight, relatively compact and structurally sound and suitable for supporting items as intended during the use of such an apparatus. Materials for the support device 10 may include, where appropriate and suitable for the reasonably safe and functional practice of the various embodiments described herein, one or more of the following materials: metals such as steel, aluminum, for example, titanium and/or stainless steel or any other metal or alloy capable of withstanding stress and strain.

In general, the support device 10 may be structured and arranged to support various items including, but not limited to, equipment, hardware, and/or safety equipment used by a technician when performing elevated line work, for example. In one embodiment, the support device 10 includes a shaft 11 having threads 12 and a pointed tip 13. In one implementation, the threads 12 may be used to secure the support device 10 into a utility pole, tree trunk, wall, rock face or any other vertical or columnar object, member or structure capable of receiving a support device 10, as described herein. It can be appreciated that the threads 12 may be replaced with any securing means to retain the shank in a utility pole or structure, such as barbs or teeth disposed about the shaft 11.

The support device also may include a stop member 14 positioned on the shaft 11 distally from the threads 12. In general, the stop member 14 may be structured and arranged to impede the advancement of the shaft 11 into a utility pole, for example.

As shown, the support device 10 further includes a curved portion 15 and a pusher 16 extending from the shaft 11. In this embodiment, the pusher 16 is structured and arranged to be substantially solid. In some cases, the pusher 16 may have a relatively concave top surface.

The curved portion 15 and pusher 16 may be formed, in one embodiment, by splitting the shaft 11 by any means suitable for splitting a metal or alloy. These may include, for example, punching a section out of the shaft 11 and then bending the curved portion 15 into the desired shape by any means known in the metal working art. In another example, the curved portion 15 and the pusher 16 may be formed by cutting the shaft 11 into sections using a bandsaw specially adapted for cutting metals or any other means known in the metalworking art.

After forming the curved portion 15 and the pusher 16, it may be necessary to apply metallurgical techniques to the support device 10 to achieve the desired strength and rigidity. In one example, the fully formed support device 10 may be stress-relief annealed to improve its metallurgical qualities.

In one implementation, a technician may drive the support device 10 into a utility pole using a powder driver 20, such as a powder-actuated tool, for example. Using a powder driver 20 to drive the support device 10 into a utility pole may be more efficient than using a large, heavy hammer.

In one embodiment, the powder driver 20 includes a powder cartridge (powder load) 21 and a trigger 22 for actuating a piston 23 within a barrel 24. As shown a muzzle extender 25 is fitted to the end of the barrel 24 and cradles a support device 10 having a pusher 16.

In one implementation, the powder cartridge 21 is loaded into the powder driver 20 and the support device 10 is placed into the muzzle extender 25. A technician positions the powder driver 20 for firing by pressing the muzzle extender 25 against a utility pole (or other target) and applying enough pressure to release a safety. Once the safety has been released, the technician then pulls the trigger 22 causing a firing pin to release and strike the powder cartridge 21. The powder in the cartridge 21 ignites and burns releasing a burst of expanding gas that drives the piston 23 within the barrel 24. The piston 23 strikes the pusher 16 and drives the support device 10 through the muzzle extender 25 and into the utility pole.

In one embodiment, the velocity of the piston and driving force of the support device 10 depends on the powder load. In one embodiment, the powder load includes a 32 caliber blank. In other embodiments, the powder load may be greater or less depending on the material in which the support device 10 is to be seated. In some embodiments, the powder driver 20 may have an adjustable power level. In general, adjusting the power level changes the volume of the piston chamber to control piston velocity.

In one implementation, the powder driver 20 may be a single-shot tool. That is, after each shot is fired, a new powder cartridge 21 must be loaded into the powder driver 20. In other implementations, the powder driver 20 may be a semi-automatic tool having a multi-shot powder cartridge.

In one embodiment, the powder driver 20 may be mounted on an extension pole (not shown). This design may allow a technician to drive a support device 10 into an elevated portion of a utility pole while standing on the ground.

It can be appreciated that the design and/or use of support device 10 and powder driver 20 may be required to comply with applicable manufacturing and/or operating standards such as those set forth by the Powder Actuated Tool Manufacturers Institute (PATMI) and American Society of Testing and Materials (ASTM). Furthermore, technicians may be required to be trained and licensed to use the powder driver 20. In addition, technicians also must be equipped with suitable eye, ear, and face protection during use of the powder driver 20.

In one implementation, a technician may drive the support device 10 into a utility pole such that the curved portion 15 and pusher 16 project outwardly from the pole and the threads 12 and pointed tip 13 are embedded in the pole. After securing the support device 10, the technician then may support various items including, but not limited to, equipment, hardware, and/or safety equipment used when performing elevated line work, for example.

Referring to FIGS. 3A–3C, another embodiment of a support device 30 is illustrated. As shown, the support device 30 includes a shaft 31 having threads 32 and a pointed tip 33. The support device 30 also includes a stop member 34, a curved portion 35, a pusher 36, and a ring portion 37. In this embodiment, the pusher 36 is structured and arranged to be substantially solid. In some cases, the pusher 36 may have a relatively concave top surface.

In some implementations, a technician may drive the support device 30 into a utility pole using a powder driver 20, for example. As such, the curved portion 35, the pusher 36, and the ring portion 37 may project outwardly from the pole and the threads 32 and pointed tip 33 may be embedded in the pole. The technician then may use the support device 30 to support various items including, but not limited to, equipment, hardware, and/or safety equipment used when performing elevated line work, for example.

Figure 4B:
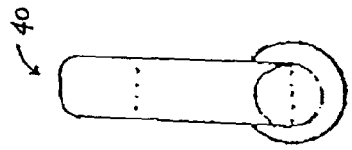
FIGS. 4A–4C illustrate one embodiment of a support device.
Figure 4A:
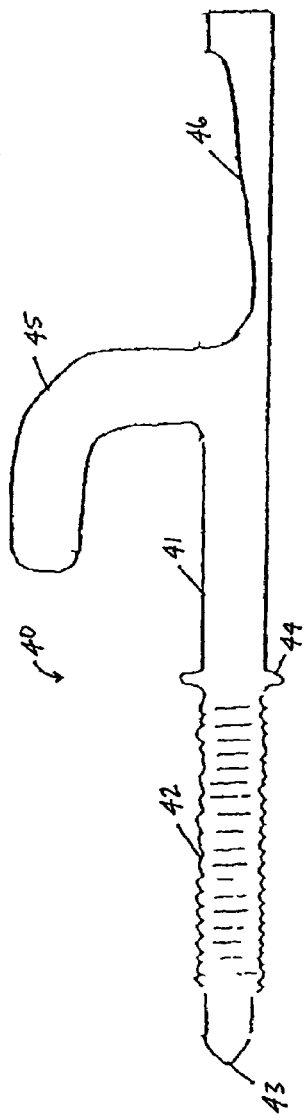
Figure 4C:
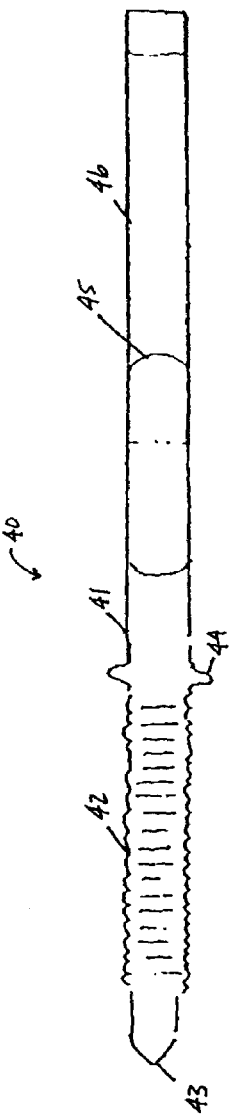

Referring to FIGS. 4A–4C, another embodiment of a support device 40 is illustrated. As shown, the support device 40 includes a shaft 41 having threads 42 and a pointed tip 43. The support device 40 also includes a stop member 44, a curved portion 45, and a pusher 46. In this embodiment, the pusher 46 is tapered and hooked. In some cases, the pusher 36 may have a relatively flat top surface.

In some implementations, a technician may drive the support device 40 into a utility pole using a powder driver 20, for example. As such, the curved portion 45 and the pusher 46 may project outwardly from the pole and the threads 42 and pointed tip 43 may be embedded in the pole. The technician then may use the support device 40 to support various items including, but not limited to, equipment, hardware, and/or safety equipment used when performing elevated line work, for example.

Figure 5A:
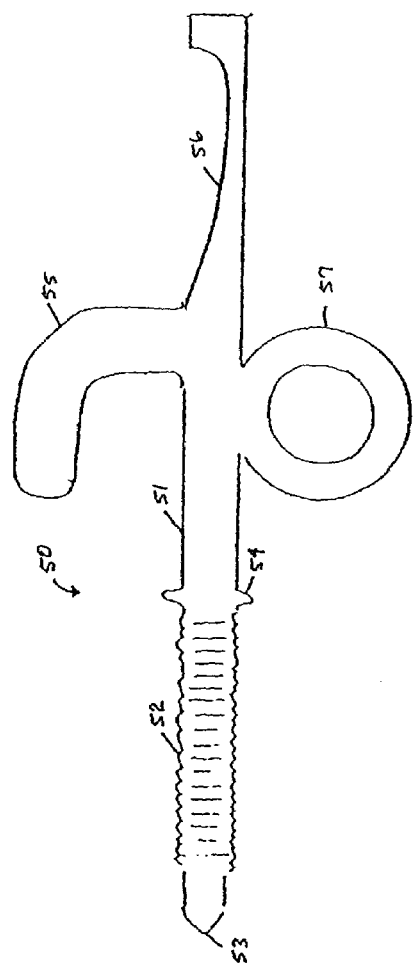
FIGS. 5A–5C illustrate one embodiment of a support device.
Figure 5B:
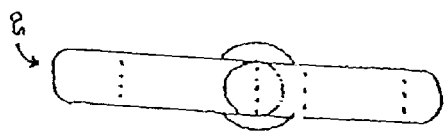
Figure 5C:
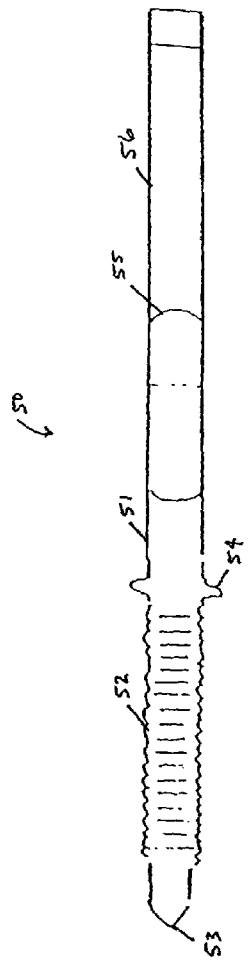

Referring to FIGS. 5A–5C, another embodiment of a support device 50 is illustrated. As shown, the support device 50 includes a shaft 51 having threads 52 and a pointed tip 53. The support device 50 also includes a stop member 54, a curved portion 55, a pusher 56, and a ring portion 57. In this embodiment, the pusher 56 is tapered and hooked. In some cases, the pusher 56 may have a relatively flat top surface.

In some implementations, a technician may drive the support device 50 into a utility pole using a powder driver 20, for example. As such, the curved portion 55, the pusher 56, and the ring portion 57 may project outwardly from the pole, and the threads 52 and pointed tip 53 may be embedded in the pole. The technician then may use the support device 50 to support various items including, but not limited to, equipment, hardware, and/or safety equipment used when performing elevated line work, for example.

Figure 6A:
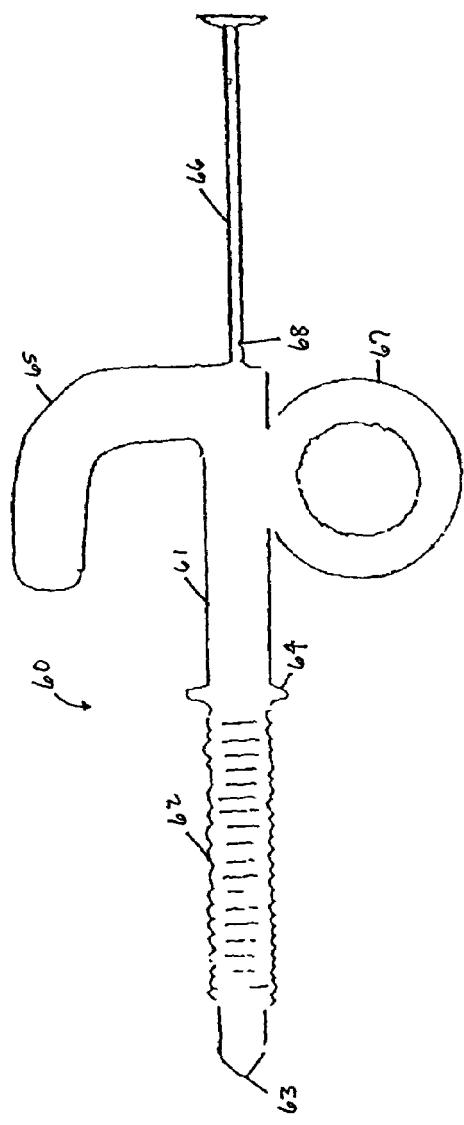
FIGS. 6A and 6B illustrate one embodiment of a support device.
Figure 6B:
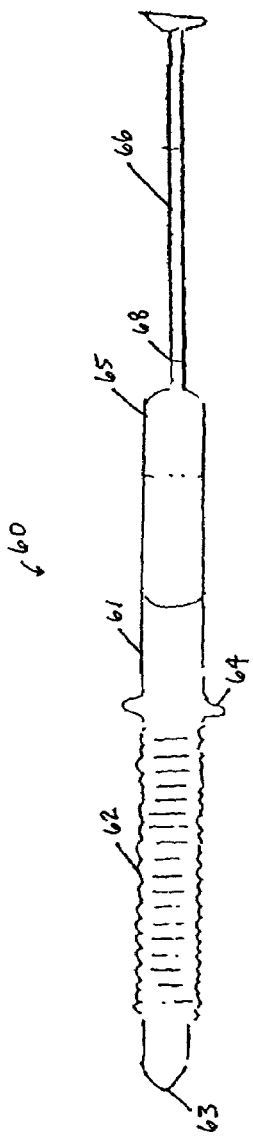

Referring to FIGS. 6A and 6B, another embodiment of a support device 60 is illustrated. As shown, the support device 60 includes a shaft 61 having threads 62 and a pointed tip 63. The support device 60 also includes a stop member 64, a curved portion 65, a pusher 66, and a ring portion 67.

In this embodiment, the pusher 66 may be structured and arranged to snap off from the rest of the support device 10. For example, the pusher 66 may be constructed so as to have a relatively thin design. In addition, the pusher 66 may include a notch 68 for allowing the pusher 66 to break away more easily. In some cases, the pusher 66 may have a relatively flat top surface.

In some implementations, a technician may drive the support device 60 into a utility pole using a powder driver 20, for example. As such, the curved portion 65, the pusher 66, and the ring portion 67 may project outwardly from the pole and the threads 62 and pointed tip 63 may be embedded in the pole. The technician may snap of the pusher 66 and then use the support device 60 to support various items including, but not limited to, equipment, hardware, and/or safety equipment used when performing elevated line work, for example.

The examples presented herein are intended to illustrate potential implementations of the present method and system embodiments. It can be appreciated that such examples are intended primarily for purposes of illustration. No particular aspect or aspects of the example method and system embodiments described herein are intended to limit the scope of the present invention. The configuration and specific functions of a particular support device, for example, are provided merely for convenience of disclosure.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein.

It can be appreciated that, in some embodiments of the present methods and systems disclosed herein, a single component can be replaced by multiple components, and multiple components replaced by a single component, to perform a given function. Except where such substitution would not be operative to practice the present methods and systems, such substitution is within the scope of the present invention.

Whereas particular embodiments of the invention have been described herein for the purpose of illustrating the invention and not for the purpose of limiting the same, it can be appreciated by those of ordinary skill in the art that numerous variations of the details, materials and arrangement of parts may be made within the principle and scope of the invention without departing from the invention as described in the appended claims.

What is claimed is:

1. A support device comprising:
   a shaft having a first end and a second end;
   threads disposed at the first end of the shaft for use in securing the device to a pole;
   a plurality of support members disposed on the second end of the shaft for supporting an object from the device, the plurality of rigid support members being integral with the shaft;
   a pusher integral to the second end of the shaft and adapted to drive the shaft into the pole, wherein the pusher is tapered and the pusher including:
      a driving end adapted to receive force applied from a piston of a powder driven tool, and
      an extension portion extending from the driving end and, wherein the extension portion is integral with the shaft;
   a stop member positioned distally of the threads on the shaft.

2. The support device of claim 1, wherein the shaft comprises stainless steel.

3. The support device of claim 1, wherein the shaft comprises titanium.

4. The support device of claim 1, wherein the shaft has a concave surface.

5. The support device of claim 1, wherein the rigid support member comprises a curved portion.

6. The support device of claim 1, wherein the rigid support member comprises a ring portion.

7. The support device of claim 1, wherein a first rigid support member comprises a curved portion and a second rigid support member comprises a ring portion.

8. The support device of claim 1, wherein the pusher comprises a concave surface.

9. The support device of claim 1, wherein the pusher comprises a planar surface.

10. The support device of claim 1, wherein the pusher comprises a hook portion.

11. The support device of claim 1, wherein the pusher is thinner than the shaft.

12. The support device of claim 1, wherein the pusher comprises a notch.

13. An assembly comprising:
a powder driven tool including a powder cartridge, a barrel, a piston within the barrel, and a trigger for actuating the piston within the barrel; and
a support device including a pusher on a first end where the pusher is located at least partially within the barrel and is adapted to receive force applied from the piston for driving a second end of the support device into a pole,
wherein the support device comprises at least one of a curved portion and a ring portion.

14. The assembly of claim 13, wherein the powder driven tool further comprises a muzzle extender connected to the barrel for cradling the support device.

* * * * *